US005760825A

United States Patent [19]

Grenier

[11] Patent Number: 5,760,825

[45] Date of Patent: Jun. 2, 1998

[54] SOUND PICKUP SYSTEM COMPRISING A VIDEO SYSTEM FOR THE SETTING OF PARAMETERS AND SETTING METHOD

[75] Inventor: Yves Grenier, Magny-les-Hameaux, France

[73] Assignee: France Telecom, Paris, France

[21] Appl. No.: 574,397

[22] Filed: Dec. 18, 1995

[30] Foreign Application Priority Data

Dec. 21, 1994 [FR] France .................................. 94 15429

[51] Int. Cl.$^6$ .................................................. H04N 7/14

[52] U.S. Cl. ............................ 348/15; 348/738; 348/722

[58] Field of Search ............................... 348/722, 15, 17, 348/738, 563; 381/56, 57

[56] References Cited

U.S. PATENT DOCUMENTS

| | | | |
|---|---|---|---|
| 4,802,227 | 1/1989 | Elko et al. | 381/92 |
| 5,548,346 | 8/1996 | Mimura et al. | 348/15 |
| 5,594,494 | 1/1997 | Okada et al. | 348/17 |

FOREIGN PATENT DOCUMENTS

| | | |
|---|---|---|
| A-352627 | 1/1990 | European Pat. Off. . |
| A-356327 | 2/1990 | European Pat. Off. . |
| WO-A-9416517 | 7/1994 | WIPO . |

OTHER PUBLICATIONS

Patent Abstracts of Japan, vol. 16, No. 39, Jan. 1992; JP-A-03245203.

*Primary Examiner*—Victor R. Kostak
*Attorney, Agent, or Firm*—Nilles & Nilles, S.C.

[57] ABSTRACT

A sound pickup system with which there are associated a video aiming system and a method for the setting of the characteristic parameters of the sound pickup. The device comprises, in addition to the network of sensors, a control unit and a circuit for the setting of the characteristic parameters, a video camera, a video screen and a circuit for coupling the screen to the a circuit for setting the characteristic parameters of each of the sound reception channels in order to achieve a superimposition of images so that it is possible to control the setting of the parameters with respect to the position and size of the sound sources. A method for the setting of the characteristic parameters of the sound pickup enables the interpolation of the coefficients of digital filters linearly and in time. Application to sound pickup systems adapted to conference halls.

18 Claims, 4 Drawing Sheets

SOUND PICKUP SYSTEM COMPRISING A VIDEO SYSTEM FOR THE SETTING OF PARAMETERS AND SETTING METHOD

BACKGROUND OF THE INVENTION

1. Field of the Invention

The invention relates to a sound pickup system with which a video aiming system is associated.

This system may be particularly useful in certain applications and especially during conferences, concerts or any other event requiring perfect quality sound pickup systems.

The system according to the invention enables the sounds coming from different sound sources to be picked up simultaneously and independently without its being necessary to bring the sensors closer to these sources. This is achieved while at the same time providing the auditory impression that the sound is being picked up near each source. For this purpose, it makes it possible to reduce the reverberation of the sound as well as of the level of ambient noise.

2. Description of the Prior Art

Various sound pickup systems have already been prepared with a view to picking up the sounds without having to bring the sensors closer to the sources.

These systems include networks of sensors, a control unit using notably filters for the processing of the signals received by the sensors and means for the setting of the characteristic parameters of the sound pickup systems.

However, such systems do not enable any independent setting of the characteristic parameters of the sound reception channel, in order to pick up the sounds from different sound sources separately. Nor is it possible to control the variations of these parameters with respect to the position and size of the sound sources from which the sounds are picked up.

The patent EP 0 381 498 furthermore describes a sound pickup system comprising a circuit for the changing of the coefficients of the digital filters that enable the arbitrary variation of the directional characteristics of the sound reception channels.

However, during the changing of the coefficients of the filters, small disturbances are audible and have a deleterious effect on the quality of the sound. These disturbances are due to the sudden change in the set of characteristic parameters of the sound pickup system, which is governed by the changing of the coefficients of the filters.

These systems furthermore cannot be used to obtain all the precision desired for the setting of the characteristic parameters of the sound reception channels.

SUMMARY OF THE INVENTION

The present invention can be used to overcome this problem. Indeed, an object of the invention is a system comprising a network of sensor elements, a control unit using, in particular, filters for the processing of the signals received by the sensors, a camera and a video screen. The camera is used to give the screen a video signal corresponding to the image of the zone in which there are the sound sources from which the sound is picked up. The video screen for its part enables the display of the sound sources filmed by the camera as well as the variations of the characteristic parameters of each of the sound reception channels. Thus, it is possible to carry out a very precise setting of the parameters in taking account of the position and size the sound sources.

An object of the invention more particularly is a sound pickup system comprising a network of sensors, a control unit and means for the setting of the characteristic parameters of the sound pickup system, wherein chiefly said system further comprises a video camera, a video screen that displays a first video image corresponding to the signal coming from the camera and means for coupling the screen to the means for setting the characteristic parameters of each of the sound reception channels. These coupling means make it possible, for each of the sound reception channels, to obtain another video image showing the variations of the characteristic parameters, and make it possible to superimpose this image on the first video image so as to control the setting of these parameters.

An object of the invention also is a method for the setting of the characteristic parameters of the sound pickup system wherein the control unit carries out a processing operation on the signals picked up and on the signals that correspond to the values of the parameters and that are given by the setting means, comprising the following steps:

- filtering of the signals picked up by the linear interpolation filters,
- modification of the coefficients of the filters for each modification of parameters,
- linear interpolation in time, at each sampling instant, between two values, corresponding to the renewal of the filters, that are modified at a rate that is regular but slower than the sampling frequency.

BRIEF DESCRIPTION OF THE DRAWINGS

Other features and advantages of the invention shall appear from the following description, given by way of a non-restrictive example with reference to the appended figures of which.

MORE DETAILED DESCRIPTION

Figure 1:
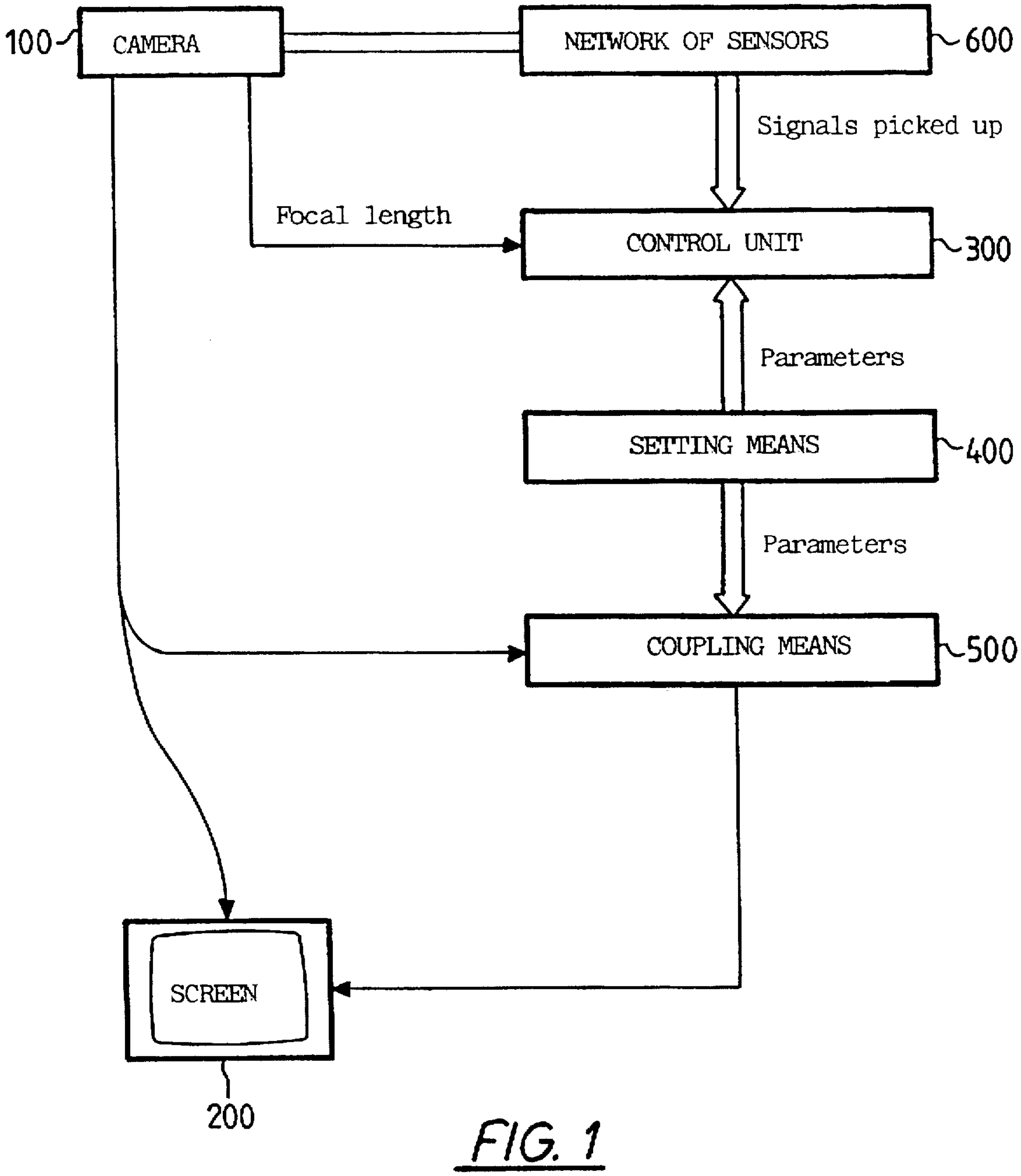
FIG. 1 shows a general view of a system according to the invention.

An embodiment of a system according to the invention will be understood more clearly with reference to FIG. 1 which describes a general view of a system of this kind.

At a first stage, the optical field of a camera 100 covers the entire zone in which there are the sound sources from which the system picks up sounds. The video signal coming from the camera is then transmitted to a video screen 200 that displays a first corresponding video image. The notion of screen covers every type of camera such as, for example, the screen of a video monitor.

The camera gives, furthermore, a value of its focal length to the control unit 300. This value is useful for carrying out the computations of angles which shall be described in greater detail here below.

At a second stage, the setting means 400 enable the setting of the characteristic parameters of each of the sound reception channels. The signal coming from these setting means 400 is transmitted to coupling means 500 for the coupling of the screen 200 to the setting means 400. The coupling means 500 enable the performance, for each of the sound reception channels, of another video image and the superimposing of this image on the first image. This superimposing of images enables the performance of a precise setting of the characteristic parameters of each sound reception channel and the checking of the variations of this setting with respect to the position and size of the sound sources from which the system picks up the sounds.

The signal representing the values of the setting parameters is also transmitted to the control unit 300 which in particular has the task of filtering the signals received by the network 600 of sensors and of periodically updating the coefficients of the filters.

Figure 2:
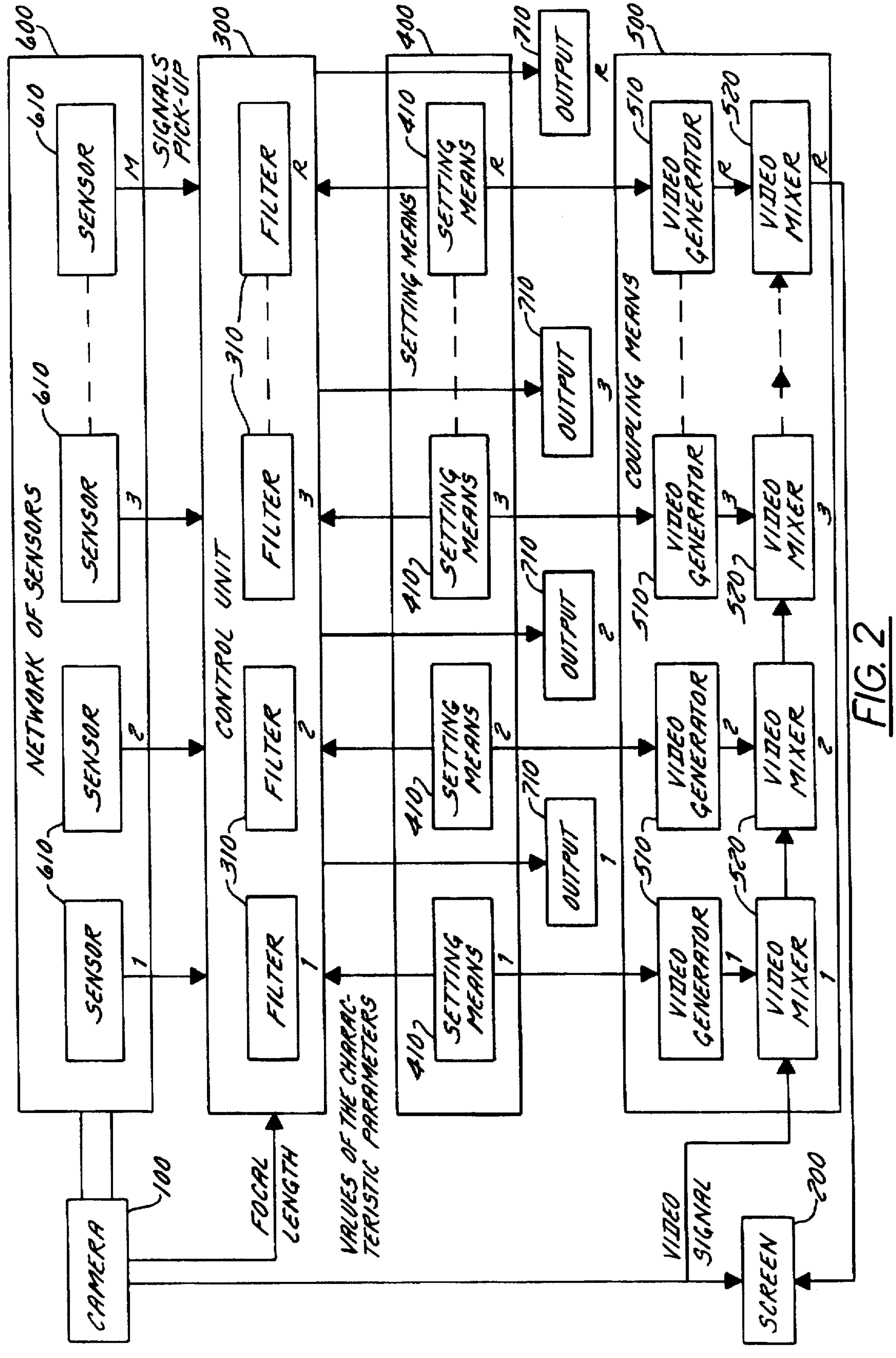
FIG. 2 shows a more detailed drawing of a system of FIG. 1.

FIG. 2 shows a more detailed diagram of a system according to the invention.

The network 600 of sensors has a number M of sensors 610 whose task is to pick up the sounds coming from several sound sources and transmit the corresponding signals to a control unit 300. This control unit then processes these signals, notably by filtering. The number M of sensors 610 is preferably at least equal to 2 and the number m associated with each sensor 610 consequently varies from 1 to M.

To enable the processing of these signals received by the M sensors 610, the control unit must also know the values of the characteristic parameters of each sound reception channel. This is why signals corresponding to the values of these parameters are sent from the network 400 of adjusting means to the control unit. This network 400 has a number R of setting means 410. Each of these setting means 410 for the setting of the characteristic parameters of the sound pickup system corresponds to a sound reception channel. The number R of setting means 410 and, consequently, the number of sound reception channels is preferably at least equal to 1 and the number r associated with each of these means therefore varies from 1 to R.

Furthermore, each sound reception channel r is associated with an output 710 where the signals are available.

To carry out a superimposing of video images, coupling means 500 for coupling the video screen 200 to the setting means 400 are introduced into the structure of the system.

Advantageously, for each of the setting means 410 used to set the parameters of each of the sound reception channels, these coupling means 500 comprise a video generator 510 and a video mixer 520. The video generator 510 enables the conversion of the signal coming from the corresponding setting means into a video signal. The mixer 520 enables the mixing of the signals coming from the video generators with one another and enables also these signals to be mixed with the signal coming from the camera. The signal coming from the last video mixer is then sent to the screen 200. Thus, on the first video image corresponding to the signal coming from the camera, a superimposing of the images is obtained, revealing the variations of the characteristic parameters of each of the sound reception channels.

Figure 3:
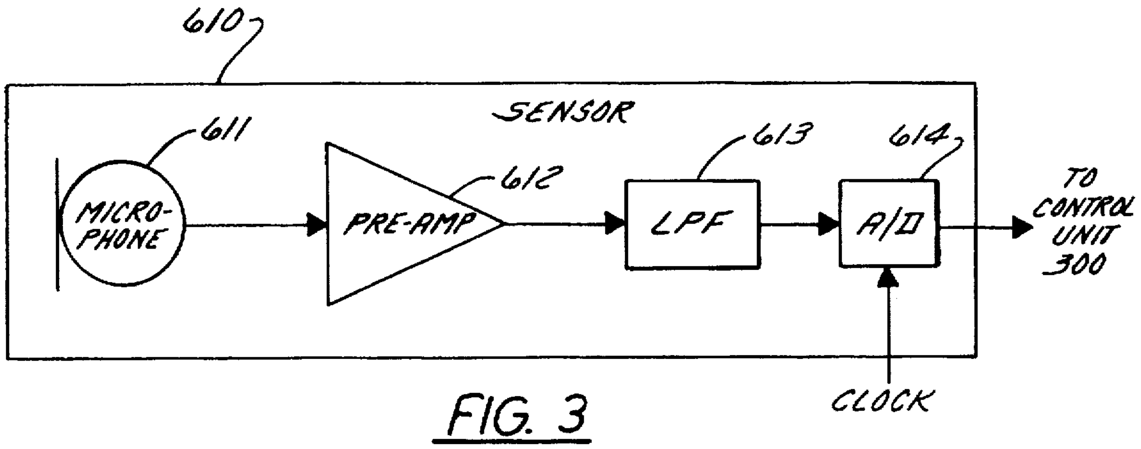
FIG. 3 is a drawing of an embodiment of a sensor.

FIG. 3 illustrates the making of a sensor 610. A sensor of this kind has a microphone 611, a preamplifier 612, a lowpass filter 613 and an analog-digital converter 614.

The signal picked up by the microphone 611 is injected into a preamplifier 612 and then filtered by the lowpass filter 613 to eliminate the spectral aliasing that could be introduced by the analog-digital converter 614. Each sensor receives a clock signal that sets the sampling frequency of the converter 614. The sampled signal is quantified by the converter 614 and transmitted in digital form to the control unit which will process it.

Figure 4:
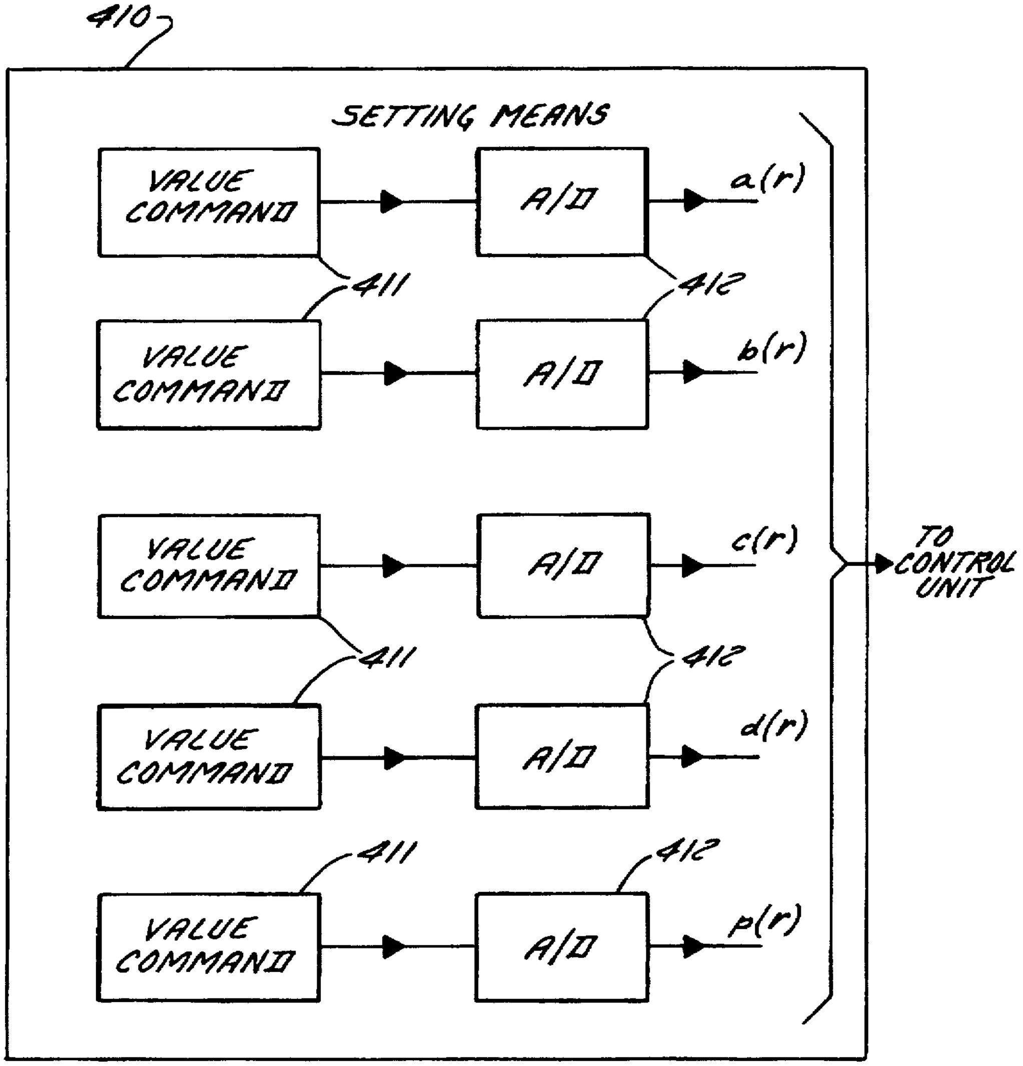
FIG. 4 shows a drawing of an embodiment of a means for setting the characteristic parameters of a sound reception channel r.

A preferred diagram of the embodiment of a setting means 410 for setting the parameters corresponding to a reception channel r is illustrated in FIG. 4.

A command 411 enables the fixing of the values of the characteristic parameters of the corresponding sound reception channel r. This command may be mechanical or electronic. It will be, for example, a handle, a rotating or linear button, or a mouse acting on a potentiometer.

Each of the parameters is converted into a digital value at a fixed rate by an analog-digital converter 412. These digital values advantageously range from 1 to a boundary value.

The rate of sampling of the values will preferably be smaller than the rate of sampling in the sensors 610. For example, a value of 25 Hz is chosen. According to one variant, it is also possible to choose a value in the range of frequencies from 1 Hz to 50 Hz.

After sampling in the converters 412, the set of values of the parameters is transmitted to the control unit 300 so that this unit carries out the processing of the signals.

The characteristic setting parameters for each sound reception channel r are the following:

the x-axis value of the point aimed at on the video screen, the y-axis value of the point aimed at on the screen, the width of the reception channel r formed, referenced c(r), the height of the reception channel r formed, referenced d(r), the depth of the reception channel r formed, reference p(r).

The x-axis value of the point aimed at on the screen has a one-to-one relationship with the horizontal angle of aim referenced a(r), and the y-axis value of the point aimed at on the screen has a one-to-one relationship with the vertical angle of aim referenced b(r). The width and the height of the video screen correspond to the value of the focal length of the camera.

Consequently, the camera 100 gives the value of its focal length to the control unit 300 so that the latter can obtain a correspondence between the values of angles at the x-axis and at the y-axis of the point aimed at on the screen, which is referenced in an arbitrary system of units such as, for example, percentage.

Thus, the minimum value of the x-axis corresponding to the value of the point furthest to the left on the screen has been fixed at 0% for example, and the maximum value of the x-axis corresponding to the value furthest to the right on the screen has been fixed at 100%. Since the control unit knows the value of the focal length of the camera, namely the value of the maximum angle of aperture corresponding to the width of the screen, defined by the value 100%, this control unit can, by a simple ratio operation, determine the value of the horizontal angle of aim, corresponding to any value on the x-axis of a point aimed at on the screen.

Preferably, A is used to define the maximum number of values corresponding to a(r), B the maximum number of values corresponding to b(r), C the maximum number of values corresponding to c(r), D the maximum number of values corresponding to d(r) and P the maximum number of values corresponding to p(r).

According to one mode of implementation of the invention, a user advantageously fixes the value of at least one parameter out of all these parameters. The parameters that are not fixed by the user advantageously receive a value by default or else a value deduced from another parameter. Thus, for example, if the height d(r) of the reception channel r is not set by the user, the value taken may be equal to the width c(r) of the reception channel r.

According to another variant, it is assumed that if one of the parameters is not relevant for the making of the system, its maximum value and hence its current value are fixed at 1.

Figure 5A:
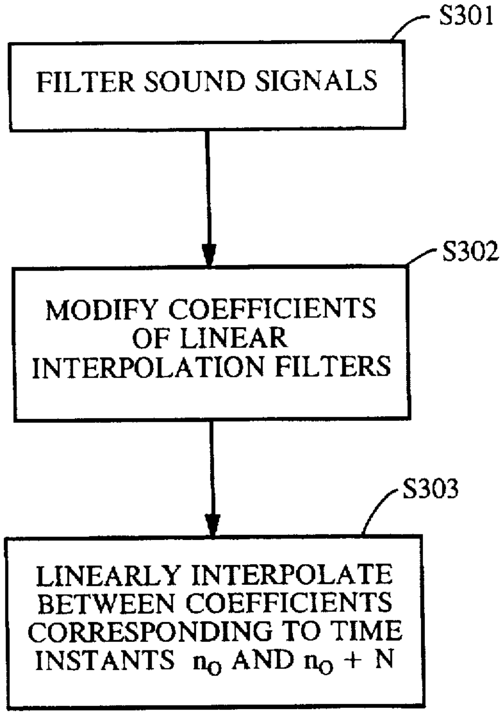
FIGS. 5A and 5B show exemplary processes for processing sound signals and for determining a function F which links characteristic parameters to values of the filter coefficients, respectively.
Figure 5B:
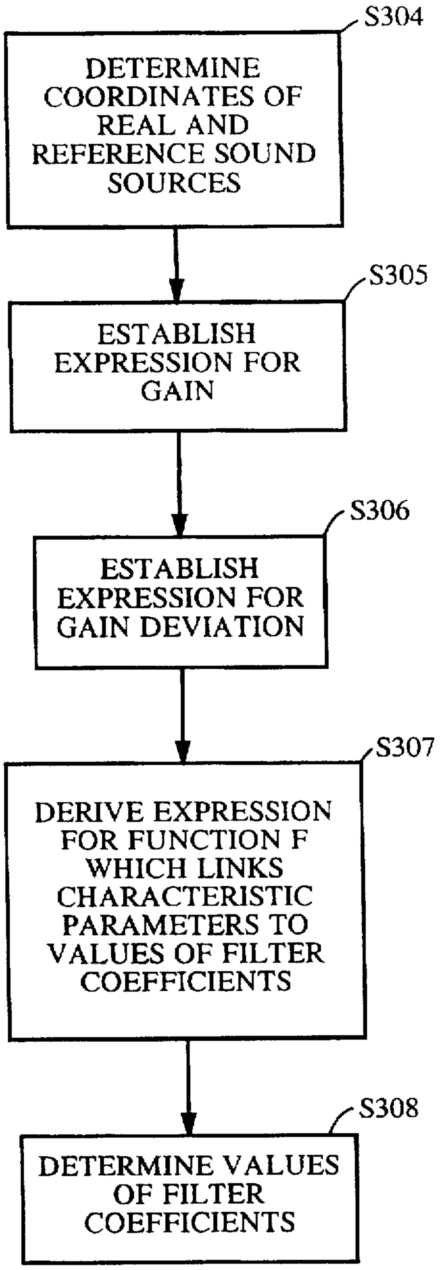

Referring now to FIG. 5A and 5B, the control unit 300 enables the processing of the signals coming from the sensors 610. It also processes the signals coming from the setting means representing the values of the parameters. These values of parameters affect the computation of the values of the coefficients of the digital filters 310, namely the directional characteristics of the sound reception channels. Consequently, the values of the parameters of the reception channels play a major role in the processing of the signals coming from the sensors since these signals will not be processed in the same way according to the directional characteristic fixed for each reception channel.

Initially, the processing that has to be performed on the signals coming from the M sensors 610 consists of the formation, at each instant n, of the R signals at output of the focused channels. These signals will be available at the outputs 710.

The signals received by the M sensors and converted into digital signals by the analog-digital converters 614 at the sampling instants n are referenced x(m,n).

These signals are filtered by R digital filters having a number Q of coefficients (step S301), where q represents the number of the coefficient and varies from 1 to Q, to give R signals referenced y(r,m,n) representing the contributions at the instant n of the sensor m in the channel r, according to the following equation:

$$y(r,m,n)=\Sigma^{Q}_{q=1}h(q,r,m,n)\times(m,n-q) \qquad (1)$$

In accordance with the usual structures for the formation of wideband channels, described by S. Haykin and T. Kesler in "Relation between the radiation pattern of an array and the two-dimensional discrete Fourier transform", published in the IEEE Journal Transactions on Antennas and Propagation, Vol. 23, No. 3, pp. 419–420, 1975, each output s(r,n) in a channel r at the instant n is obtained by taking the sum of the M signals y(r,m,n) according to the equation:

$$s(r,n)\times\Sigma^{M}_{m\times1}y(r,m,n) \qquad (2)$$

The signal s(r,n) in the channel r is given in digital form by the control unit 300 to the corresponding output 710.

One variant would consist in giving the signal s(r,n) in the channel r to the corresponding output 710, in analog form, after passing it into a digital-analog converter.

In a second stage (step S302), the processing that has to be performed on the signals coming from the R setting means consists of the modification, at each instant n, of the values of the coefficients of the filters in order to modify the directional characteristics of the sound reception channels.

The coefficients h(q,r,m,n) of the filter r in the channel r for the sensor m depend on the instant n. The coefficients are updated on the basis of information elements, namely on the basis of the values of the parameters acquired by the control unit 300 from the R setting means 400 and transmitted at intervals of every N samples to the control unit 300. Thus, if the coefficients are updated at the instant no, they will be updated again at the instant $n_o$+N.

Preferably, a method for the setting of the characteristic parameters of the sound pickup system consists furthermore of the reconstituting, by computation, of the values of the coefficients of the filters between these two instants $n_o$ and $n_o$+N (step S303). Thus, the values of the coefficients could be interpolated linearly according to the equation:

$$h(q,r,m,n)=[(n-n_o)/N]h(q,r,m,n_o+N)+[(n_o+N-n)]h(q,r,m,n_o) \qquad (3)$$

The control unit 300 makes a computation at each instant n of the values of the coefficients h(q,r,m,n) of the filters 310 on the basis of the values of the parameters received, at the sampling rate of the converters 412, from the R setting means 410.

When the information elements are received at an instant referenced $n_o$, the control unit determines the values, for each sound reception channel r, of the coefficients h(q,r,m,$n_o$+N) of the filters which are used for the interpolation, by means of the equation (3), of the values of the coefficients h(q,r,m,n) between the present instant $n_o$ and the instant $n_o$+N at which the information elements are received.

The values of the coefficients are therefore interpolated in time, at each sampling instant, between these two values $n_o$ and $n_o$+N, which are modified at a regular rate but preferably at a slower rate than the sampling frequency.

According to one variant, it is possible to apply the equations (1) and (2) twice. Indeed, these equations are applied a first time for filters of coefficients h(q,r,m,$n_o$). This gives the following signals: $y_o$(r,m,n) and $s_o$(r,n). These equations are applied a second time for filters having coefficients h(q,r,m,$n_o$+N) which gives the following signals: $y_N$(r,m,n) and $s_N$(r,n).

The interpolation is then performed at the level of the output signals s(r,n) according to the relationship:

$$s(r,n)=[(n-n_o)/N]S_N(r,n)+[(n_o+N-n)/N]s_o(r,n)$$

Another variant of this method will consist of the interpolation of the values of the coefficient filters 310, not only in time but also in space. In this case, the coefficients of the filters would also be interpolated between two positions, displayed on the screen, corresponding to the renewal of the coefficients of the filters.

The values of the coefficients of the filters 310 are functions of the settings, given by the control switch through the commands 411 of the setting means 410, described by the parameters a(r), b(r), c(r), d(r), p(r).

This function is referenced F(a,b,c,d,p). For each value of the quintuplet (a,b,c,d,p) of parameters, it gives a vector Q×M representing the Q coefficients of the filters corresponding to the R channels for the reception of sound from the M sensors when the settings are (a,b,c,d,p). Thus, the coefficients h(q,r,m,$n_o$) are read in the vector Q×M whose components are referenced f(m,q) for m varying form 1 to M and q varying from 1 to Q and we obtain:

$$h(q,r,m,n_o)=f(m,q) \qquad (4)$$

This function F is applied by the control unit R times to obtain the values of the coefficients of the filters corresponding to the R reception channels formed.

To arrive at an expression of the function enabling the computation of the values of the coefficients of the filters, the procedure comprises several steps.

A first step (step S304) consists in determining the coordinates of the position of a real sound source and the coordinates of the positions of fictitious sound sources taken as a reference. Thus, to find the coordinates of a real sound source, the following are determined for example: the horizontal angle $u_a$ of the beam centered on the direction defined by a, the vertical angle $v_b$ of the beam centered on the direction defined by b, the horizontal angles $u_{a1}$ and $u_{a2}$ that form the horizontal limits of the beam centered on the direction defined by a and having a width defined by c and, finally, the vertical angles $v_{b1}$ and $v_{b2}$ that form the vertical limits of the beam centered on the direction defined by b and having a width defined by d.

To find the coordinates of the positions of fictitious sound sources, a choice is made first of all of a number K of reference positions, each defined by the pair of horizontal and vertical angles ($U_k$, $v_k$) for k varying from 1 to k.

These reference sources are advantageously distributed uniformly, in the square $[-\Pi, \Pi]\times[-\Pi,\Pi]$ deprived of its central part $[u_1, u_2]\times[v_1, v_2]$. Then L reference frequencies denoted $f_i$, for i varying from 1 to L, and a reference distance which is preferably a value of depth p are chosen.

The original point in 3D space is advantageously defined by the position of the camera 100. The coordinates of the positions of the reference sources are then computed from their expression which is the following:

$$[p \operatorname{Cos}(u_k) \operatorname{Cos}(v_k),\ p \cos(u_k) \operatorname{Cos}(v_k),\ p \sin(u_k)]$$

For each fictitious source k and for each sensor m, the distance z(k,m) between the source and the sensor is computed. A computation is also made of the transfer functions from the reference sources up to the sensors for the reference frequencies. The transfer function t (m, k, $f_i$), f or the sensor m, the source k and the frequency $f_i$ is given by the equation (5) where j designates the root of −1 and V the velocity of sound:

$$t(m,k,f_i)=1/z(k,m)e^{-j2\Pi f_i[z(k,m)/V]} \quad (5)$$

This transfer function makes it possible, in a second step(step S305), to determine the expressions of the gains obtained for the fictitious sounds coming from the reference sound sources and to fix the gains that are to be obtained for these same fictitious sounds. With the filter, whose coefficients are f(m,q), the sound coming from a source located at a position k will be received for a frequency $f_i$ with a gain g(k,$f_i$) that is determined according to the equation:

$$g(k,f_i)=\Sigma^{M}_{m=1}\Sigma^{Q-1}_{q=0} f(m,q)t(m,k,f_i)e^{-j2\Pi f_i q} \quad (6)$$

The desired gains $g_s$(k,$f_i$) corresponding to the sounds coming from the sound sources located at the reference positions are fixed, this being so for reference frequencies $f_i$.

A third step (step S306) determines an expression of the deviation between the gains obtained and the desired gains. This deviation represents an error which may be reduced to a threshold value that has been set, for example by the least squares method of computation. There is then obtained an expression that represents a square of the error that is to be reduced to a threshold value and is written in the form:

$$\Sigma^{k}_{k=o}\{\Sigma^{L}_{i=1}[g(k,f_i)-g_s(k,f_i)]^2\} \quad (7)$$

This equation (7) represents the sum of squares and double products. This means that the criterion given by the equation (7) is quadratic in g(k,$f_i$). Similarly, the criterion given by the equation (6) is quadratic in f(m,q). The reduction of the error to a threshold value leads to a system with these unknown quantities f(m,q) that permits a unique solution. The solution of F is obtained by deriving the equation (7) with respect to the values of the coefficients f(m,q).

If we write T(k,f), the vector containing the components of t(m,k,f)$e^{-2\Pi fq}$ for all the pairs [m,q] listed in the same order as the vector Q×M representing F(a,b,c,d,p), a solution of F is written as follows:

$$F(a,b,c,d,p)=[^{93}{}_{k,i}T(k,f_i)T(k,f_i)^T]^{-1}\Sigma_{k,i}T(k,f_i)g_s(k,f_i) \quad (8)$$

In a last step(step S308), it is possible to determine the values of the coefficients of the filters from the expression of the function F thus found. In order to enable the values of these coefficients to be determined, there are two possibilities.

According to a first variant, the values of the coefficients are determined, before any handling, from the function F and for fixed values of parameters. Then they are memorized in a table.

This table may, for example, be a 2D table comprising Q×M rows and A×B×C×D×P columns. In this case, quintuplets (a,b,c,d,p) of parameters, for example, defining the indices of the columns and the numbers q of the coefficients of the filters corresponding to each sensor m define the indices of rows. However, the size of the table may be greater if it is decided to separate the quintuplets into 2, 3, 4 or 5 distinct parameters and if it is decided to distinguish the Q coefficients and the M sensors to store them in separate rows and columns. This storage of the values of the coefficients in a table enables the changing of the values of the coefficients at greater speed during the sound pickup operations, for fixed values of parameters. The coefficients will change value only when the values of the quintuplets of parameters, which are fixed and memorized in this table, are reached. Between these values of quintuplets, corresponding to the updating of the filters, the values of the coefficients could, for example, be interpolated.

According to a second variant, the values of the coefficients of each filter are determined in real time from the expression of the function F, and for values of parameters that vary continuously. In this case, the coefficients of the filters are preferably updated at a regular rate and their values are interpolated according to the previously established equation (3).

The orientation of the camera and that of the network of sensors must be related by any means so as to prevent any offset between, firstly, the image representing the position of the sound sources and, secondly, the images that show the variation of the characteristic parameters of the sound reception channels. In this way, it is possible to make a very precise display of the variations of the parameters with respect to the position and size of the sound sources.

Figure 6:
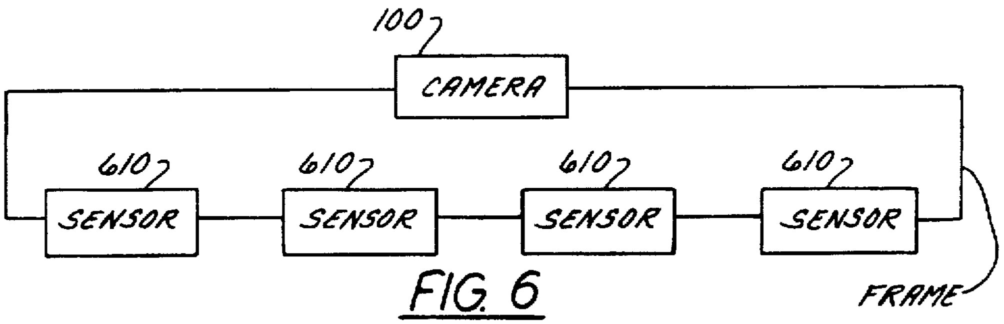
FIG. 6 shows a video camera and a network of sensors fixed to a common frame, according to a preferred embodiment of the invention.

Another embodiment of a system referring now to FIG. 6,according to the invention consequently relates to the fixing of the camera 100 with respect to the network 600 of sensors. The camera 100 is advantageously fixed to the same frame as the network 600 of sensors so that its aiming is strictly non-variant with respect to the position of the sensors.

In one variant of this system, the camera 100 is not fixed to the same frame as the network 600 of sensors. In this case, the network of sensors must have a fixed position in space and the camera too must have a position and an orientation that are fixed in space to obtain an aiming of the sound sources that does not vary with respect to the position of the sensors.

According to another alternative embodiment of the system according to the invention, it is possible to add a remote control system by which the settings of the video aiming system can be made at a distance. However, in this case, a user does not necessarily have access to the video system so much so that he cannot display the settings made. This is why, it is also preferable to fit out the system with an auditory feedback system enabling the user to make the settings directly, through the sound signals that reach him. The auditory feedback is obtained, for example, by means of a hearing device placed in the user's auditory channel and connected to the system by a cable or, better still, by means of a radiofrequency channel.

What is claimed is:

1. A sound pickup system comprising:

(A) a network of sensors, the network of sensors picking up sound coming from sound sources, (B) a control unit, the control unit having filters, the filters processing the sound received by the network of sensors, (C) means for setting characteristic parameters of the sound pickup system for a plurality of sound reception channels, the characteristic parameters representing the positions of the sound sources, (D) a visual feedback system, the visual feedback system providing visual feedback regarding the accuracy of the values of the characteristic parameters with respect to the actual positions of the sound sources, the visual feedback system including (1) a video camera, the video camera producing a first video signal, the first video signal containing a first video image, the first video image being an image of the sound sources, (2) a video generator, the video generator producing a second video image, the second video image being indicative of the values of the characteristic parameters representing of the positions of the sound sources, (3) a video mixer, the video mixer superimposing the second video image on the first video images, and (4) a video screen, the video screen displaying the first video image having the second video image superimposed thereon, the video screen thereby rendering a visual comparison of the actual positions of the sound sources with the positions of the sound sources as represented by the characteristic parameters.

2. A sound pickup system according to claim 1, wherein the video generator converts a signal corresponding to the values set for the characteristic parameters into a second video signal which contains the second video image, and wherein the video mixer mixes the second video signal with the first video signal coming from the video camera to superimpose the second video image corresponding to the characteristic parameters of each reception channel on the first video image.

3. A sound pickup system according to claim 1, wherein the filters are linear interpolation filters.

4. A sound pickup system according to claim 1, wherein the video camera is fixed to a frame, and wherein the network of sensors are also fixed to the frame.

5. A sound pickup system according to claim 1, further comprising a remote control system, the remote control system controlling the settings of the setting means at a distance, and an auditory feedback system.

6. A method for the setting of the characteristic parameters of the sound pickup system according to claim 3, wherein the control unit processes the sound signals and signals that correspond to the values of the characteristic parameters and that are given by the setting means, the method comprising:

filtering the sound signals received by the linear interpolation filters from the network of sensors, modifying coefficients of the linear interpolation filters each time the characteristic parameters are modified, linearly interpolating in time, at each sampling instant, between two values of a filter coefficient, the filter coefficient being modified at a rate that is constant but slower than the sampling frequency.

7. A method according to claim 6, wherein the modifying step includes the step of determining a function F linking the characteristic parameters of each sound reception channel to values of the filter coefficients of the corresponding sound reception channel, the determining step including the steps of determining coordinates of a position of a real sound source and of positions of fictitious reference sound sources, establishing an expression of gain obtained for fictitious sounds coming from the reference sound sources, and fixing the gains that it is desired to obtain for the fictitious sounds, establishing an expression of the deviation between the gains obtained and the gains desired, which represents an error that can be reduced to a threshold value, deriving the expression thus established, with respect to the coefficients of the filters, to arrive at an expression of the function F, and determining the values of the coefficients of the filters from the expression of the function F thus found.

8. A method according to claim 7, wherein there are determined, for fixed values of parameters, the values of the coefficients of each filter corresponding to each sound reception channel of each sensor, on the basis of the function F, and they are memorized in a table.

9. A method according to claim 7, wherein there are determined, on the basis of the function F, the values of the coefficients of each filter corresponding to each sound reception channel of each sensor, at each instant n and for values of parameters varying continuously.

10. A sound pickup system according to claim 1, wherein the characteristic parameters also relate to the size of the sound sources.

11. A sound pickup system according to claim 1, wherein the video generator comprises a plurality of video generators, including one video generator for each sound reception channel, and wherein the video mixer comprises a plurality of video mixers, including one video mixer for each sound reception channel.

12. A method of setting parameters of a sound pickup system, the method comprising the steps of:

receiving sound from a plurality of sound sources at a network of sensors, generating a first video signal using a video camera, the video signal containing a first video image, the first video image being an image of the sound sources, setting characteristic parameters of the sound pickup system for a plurality of sound reception channels, the characteristic parameters representing the positions of the sound sources, rendering a visual comparison of the actual positions of the sound sources with the positions of the sound sources as represented by the characteristic parameters, the rendering step providing visual feedback regarding the accuracy of the values of the characteristic parameters with respect to the actual positions of the sound sources, and the rendering step including the steps of generating a second video signal, the second video signal containing a second video image, the second video image being indicative of the values of the characteristic parameters representing of the positions of the sound sources, superimposing the second video image on the first video image of the sound sources, and displaying the first video image of the sound sources superimposed with the second video image which is indicative of the values of the characteristic parameters.

13. A method according to claim 12, further comprising the step of fixing the video camera and the network of sensors to a frame, so that the aiming of the video camera is non-variant with respect to the position of the network of sensors.

14. A method according to claim 12, further comprising the steps of providing an auditory feedback and a remote control system which permits the values of the characteristic parameters to be controlled at a distance in response to the auditory feedback system.

15. A method according to claim 12, further comprising the step of processing sound signals produced by the network of sensors, the processing step including the steps of:

filtering the sound signals from the network of sensors, modifying coefficients of linear interpolation filters each time the characteristic parameters are modified, linearly interpolating in time, at each sampling instant, between two values of a filter coefficient, the filter coefficient being modified at a rate that is constant but slower than the sampling frequency.

16. A method according to claim 12, further comprising the step of modifying the coefficients of linear interpolation filters for each modification of the characteristic parameters, the modifying step includes the step of determining a function F linking the characteristic parameters of each sound reception channel to values of the filter coefficients of the corresponding sound reception channel, the determining step including the steps of determining coordinates of a position of a real sound source and of positions of fictitious reference sound sources, establishing an expression of gain obtained for fictitious sounds coming from the reference sound sources, and fixing the gains that it is desired to obtain for the fictitious sounds, establishing an expression of the deviation between the gains obtained and the gains desired, which represents an error that can be reduced to a threshold value, deriving the expression thus established, with respect to the coefficients of the filters, to arrive at an expression of the function F, and determining the values of the coefficients of the filters from the expression of the function F thus found.

17. A method according to claim 16, wherein there are determined, for fixed values of parameters, the values of the coefficients of each filter corresponding to each sound reception channel of each sensor, on the basis of the function F, and they are memorized in a table.

18. A method according to claim 16, wherein there are determined, on the basis of the function F, the values of the coefficients of each filter corresponding to each sound reception channel of each sensor, at each instant n and for values of parameters varying continuously.

* * * * *